United States Patent [19]

Sacks

[11] Patent Number: 4,807,030

[45] Date of Patent: Feb. 21, 1989

[54] METHOD AND APPARATUS FOR MULTIPLEXING TELEVISION SIGNALS

[75] Inventor: Jack Sacks, Thousand Oaks, Calif.

[73] Assignee: Multilink Group, Calabasas, Calif.

[21] Appl. No.: 874,042

[22] Filed: Jun. 13, 1986

Related U.S. Application Data

[63] Continuation-in-part of Ser. No. 808,908, Dec. 13, 1985.

[51] Int. Cl.[4] .............................................. H04N 7/04
[52] U.S. Cl. ..................................... 358/141; 358/142; 358/133
[58] Field of Search ............... 358/142, 146, 133, 136, 358/11, 12, 141

[56] References Cited

U.S. PATENT DOCUMENTS

| 4,533,936 | 8/1985 | Tiemann et al. | 358/12 |
| 4,691,245 | 9/1987 | Hickok | 358/12 |

FOREIGN PATENT DOCUMENTS

| 0079390 | 5/1983 | Japan | 358/160 |

*Primary Examiner*—James J. Groody
*Assistant Examiner*—David E. Harvey
*Attorney, Agent, or Firm*—Ashen Golant Martin & Seldon

[57] ABSTRACT

A decoder for use in a multiplexing system wherein the adjacent frame lines of a first program are summed and differenced, and the sum signal and time-compressed difference signal of each line pair is transmitted during the period allotted for transmission of a single line, thereby transmitting data for two lines in the time allotted for a single line. The decoder avoids a need for complex digital wall filters at the input by sampling the timed-compressed difference signals at a non-unity multiple of the rate used for sampling the sum signals. The multiple is sufficiently fast to enable the standard "front-end" low pass filter of the decoder to function as an interpolation filter, eliminating the artifacts which would otherwise require the use of the complex filter. The disclosed decoder additionally includes a first memory-sharing arrangement wherein memory addresses are accessed during each operating cycle in a manner which permits data to be written into memory prior to the complete reading out of data from the previous operating cycle. A second memory-sharing arrangement is included wherein memory addresses are accessed during each operating cycle in a manner which permits data to be read out of the memory prior to the complete writing of data for that operating cycle, enabling re-use of certain memory addresses during the operating cycle.

23 Claims, 13 Drawing Sheets

| LINE NUMBER | RANK | LINE NUMBER | RANK |
|---|---|---|---|
| 1 | A | 47-50 | B |
| 2 | B | 51-54 | C |
| 3 | C | 55-58 | A |
| 4 | A | 59-62 | B |
| 5 | B | 63-66 | C |
| 6 | C | 67-70 | A |
| 7 | A | 71-74 | B |
| 8 | B | 75-78 | C |
| 9 | C | 79-82 | A |
| 10 | A | 83-86 | B |
| 11 | B | 87-90 | C |
| 12 | C | 91-94 | A |
| 13 | A | 95-98 | B |
| 14 | B | 99-102 | C |
| 15 | C | 103-106 | A |
| 16 | A | 107-114 | B |
| 17,18 | B | 115-122 | C |
| 19,20 | C | 123-130 | A |
| 21,22 | A | 131-138 | B |
| 23,24 | B | 139-146 | C |
| 25,26 | C | 147-154 | A |
| 27,28 | A | 155-162 | B |
| 29,30 | B | 163-170 | C |
| 31,32 | C | 171-178 | A |
| 33,34 | A | 179-186 | B |
| 35,36 | B | 187-194 | C |
| 37,38 | C | 195-202 | A |
| 39,40 | A | 203-210 | B |
| 41,42 | B | 211-218 | C |
| 43,44 | C | 219-226 | A |
| 45,46 | A | 227-241 | B |

FIG. 13

| LINE NUMBER | RANK | LINE NUMBER | RANK |
|---|---|---|---|
| 1-7 | a | 193-196 | b |
| 8-16 | b | 197-198 | c |
| 17-24 | c | 199-200 | a |
| 25-32 | a | 201-202 | b |
| 33-40 | b | 203-204 | c |
| 41-48 | c | 205-206 | a |
| 49-56 | a | 207-208 | b |
| 57-64 | b | 209-210 | c |
| 65-72 | c | 211-212 | a |
| 73-80 | a | 213-214 | b |
| 81-88 | b | 215-216 | c |
| 89-96 | c | 217-218 | a |
| 97-104 | a | 219-220 | b |
| 105-112 | b | 221-222 | c |
| 113-120 | c | 223-224 | a |
| 121-128 | a | 225-226 | b |
| 129-136 | b | 227 | c |
| 137-140 | c | 228 | a |
| 141-144 | a | 229 | b |
| 145-148 | b | 230 | c |
| 149-152 | c | 231 | a |
| 153-156 | a | 232 | b |
| 157-160 | b | 233 | c |
| 161-164 | c | 234 | a |
| 165-168 | a | 235 | b |
| 169-172 | b | 236 | c |
| 173-176 | c | 237 | a |
| 177-180 | a | 238 | b |
| 181-184 | b | 239 | c |
| 185-188 | c | 240 | a |
| 189-192 | a | 241 | b |

FIG. 14

METHOD AND APPARATUS FOR MULTIPLEXING TELEVISION SIGNALS

This is a continuation in part of copending U.S. Ser. No. 808,908, filed Dec. 13, 1985, the priority of which is claimed.

BACKGROUND OF THE INVENTION

This invention relates to the transmission and reception of television programs and, more particularly, to the multiplexed transmission of two television programs via the same communication link.

Copending U.S. Ser. No. 808,908 filed Dec. 13, 1985, is assigned to the present assignee and is hereby incorporated by reference. Briefly, the foregoing application discloses a multiplexing system in which two independent television programs, preferably in NTSC format, can be reformatted to fit a signal NTSC TV channel having a conventional base bandwidth of 4.2 MHz.

The preferred embodiment described by the above-referenced application combines the two successive video fields of an NTSC frame to form a pair of signals. One of the signals is the sum of each pair of adjacent frame lines, while the other signal constitutes the difference between the pairs of adjacent frame lines. The sum signal and difference signal of each line pair are each scaled; if a line of the first field is labelled "A" and the adjacent line of the second field is labelled "B", then the scaled sum and difference signals for the line pair can respectively be represented as $\frac{1}{2}(A+B)$ and $\frac{1}{2}(A-B)$.

The scaled difference signal in the aforementioned preferred of 4 by low pass embodiment is band-reduced by a factor filtering, thereby reducing the difference signal's bandwidth to approximately 1.05 MHz. The low-pass filtered signal is then time compressed by a factor of 4 before transmission.

The scaled sum signal of each line pair is serially combined with the time-compressed difference signal of the line pair, a chroma subcarrier reference burst, and a gray scale reference signal. The resulting line-pair signal, formed for each line pair, is transmitted serially with the line-pair signals of the other line pairs in the frame.

The preferred encoder described by the referenced application produces the line-pair signals of the encoded video frame during the time interval allotted for transmission of a video field. Because the frame has been transmitted during half the time allotted for its transmission under the NTSC broadcast format, an encoded frame of a second television program may be transmitted during the remaining field interval.

The transmitted signal, preferably comprising encoded frames of both programs in alternating succession, is received by a decoder, which separates the signal into its component parts. The original picture format of each frame is preferably reconstructed by time-expanding the compressed difference signal, smoothing it in an interpolation or reconstruction filter, and recombining it with the sum signal to reform both of the originally scanned fields. One field is reconstructed by summing the sum and difference signals while the other field is reconstructed by subtracting the difference signal from the sum signal. After this reconstruction, the signals are substantially identical to the original premultiplexed signals.

The instant invention is directed to an improved multiplexing system which avoids the use of complex digital filters. Additionally, the disclosed improvement includes a memory configuration which is shared by both transmitted programs, thereby reducing memory requirements.

It is well known that complex digital filters can be used both as anti-alias filters before sub-sampling and time compression in the encoder portion of a multiplexing system, and as interpolation or reconstruction filters in a demultiplexer. Filters having a flat response and steep cutoff at the highest transmittable frequency provide the best performance. Such filters are typically known as "wall filters" and are complex in design and expensive to produce. Accordingly, the performance of multiplexing systems has generally been compromised by selecting simpler filter designs having gradual frequency roll-offs and requiring fewer components in their implementation.

SUMMARY OF THE INVENTION

The multiplexing system disclosed herein comprises an encoder for multiplexing television programs to be transmitted, and a decoder for separating an encoded television frame into its original fields.

The decoder comprises means for receiving an input signal containing an encoded television frame. The input signal includes a plurality of sum signals and a plurality of difference signals. Each sum signal is indicative of the sum of line signals of a pair of lines in the unencoded television frame. Each difference signal is indicative of the time-compressed difference between the line signals of a pair of lines in the unencoded television frame.

The decoder additionally includes means for sampling and holding the sum signals at a first effective rate, and means for sampling and holding the time-compressed difference signals at a second effective rate which is a multiple of the first effective rate, thereby producing respective time-expanded difference signals. The multiple is proportional to the compression ratio of the difference signal to the sum signal.

Means are provided for adding the sum and time-expanded difference signals for each line pair to substantially recover one of the paired line signals; means are also included for differencing the sum signal and time-expanded difference signal for each line pair to substantially recover the other of the paired lines.

In accordance with another aspect of the invention, a memory-sharing arrangement is disclosed whereby both multiplexed programs share the same memory. Since the compressed frame of a program is applied to the decoder during a field interval, and the decoded fields of the frame are generated by the decoder during two field intervals, each of the two programs requires at least one field of each frame to be stored while the other is being generated. Additionally, memory must be provided to accommodate at least a portion of the other, first-to-be-produced field owing to the difference in line length of an incoming line pair line signal and an outgoing field line.

Although each program may utilize its own dedicated memory, the disclosed memory-sharing arrangement reduces the cost of the decoder significantly. The arrangement accordingly includes first memory means having uniquely addressable locations for storing the values of the recovered line signals for at least a portion of one of the fields, and second memory means having uniquely addressable locations for storing the values of the recovered line signals for the other field.

Means are provided for a simultaneously writing said first field data into said first memory means and reading said data from said first memory means. The writing is commenced before the reading, a substantial portion of the first field data is thereafter written into memory locations from which the field data has already been read. For convenience, the term "write before read" (or simply "WBR") memory may be used when referring to the first memory means, to indicate that some data is written before the reading commences.

The other (delayed) field of the frame under consideration is stored in a "read before write" (RBW) memory. In accordance with another aspect of the invention, the decoder includes means for simultaneously writing second field data of one program into locations in said second memory means from which second field data from the other program has already been read. The reading being commenced before the writing, and the data from said one program be program being written into memory locations from which the data from said other program has previously been read.

In the preferred operation, a compressed frame of a program is received and decoded into its two fields during a field interval. Accordingly, the compressed frame of program #1 arrives at the decoder and is decoded during a field interval. The compressed frame of program #2 arrives during the next field interval. The data for the first field is written into the WBR memory, with the reading commencing after a few lines have been written. The memory is configured as a plurality of ranks, with data being simultaneously read and written in different ranks. While data is being written into, and read from, the WBR memory during the field interval, data for the second field of the compressed frame of the program is being written into the RBW memory for reading out during the next field interval. The data begins to be read out just prior to new data for the next frame's field being written in. The new data represents the delayed field of the decoded frame associated with the second program which is presented to the decoder during the following field interval.

The first field of program #2 is then written into memory from which program #1 data has already been read during the previous field interval. The second field of program #2 is written into RBW memory locations from which program #1 data has already been read during the same field interval. The writing of program #2 data occurs simultaneously with the reading of program #1 data in the RBW memory. The invention, both as to its apparatus and method of operation, together with additional details and advantages will be best understood with the aid of the following Description of the Preferred Embodiment, of which the following drawing is a part.

DESCRIPTION OF THE DRAWING

FIGS. 13 and 14 are tables showing the data storage arrangement for RBW and WBR memories, respectively.

DESCRIPTION OF THE PREFERRED EMBODIMENT

Figure 1:
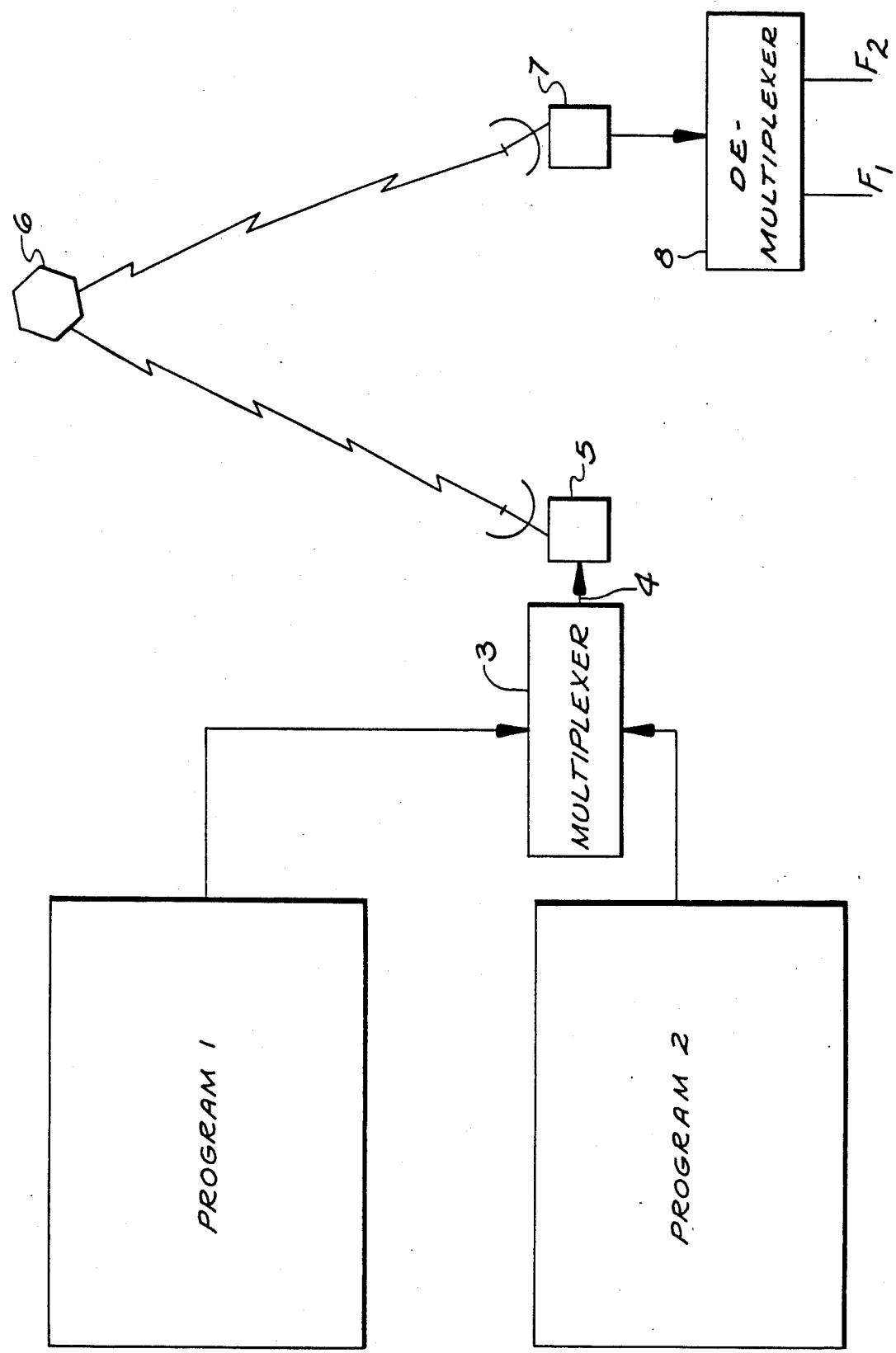
FIG. 1 is an illustration of the fundamental operation of a multiplexing system constructed in accordance with the invention.

The invention herein comprises both an apparatus and method for packing two television signals into the bandwidth normally required by one such signal, and apparatus and method for substantially reconstructing the original signals. The method and system described herein is particularly suitable for NTSC broadcast systems used in the United States and Japan, although those skilled in the art will recognize its pertinence to other systems used elsewhere in the world. For convenience, the description of the multiplexer will accordingly be described in terms of the NTSC system, with the understanding that with modifications, its use is not so limited.

It will also be understood that the multiplexer herein need not pack two television signals into the bandwidth normally required by one of the signals, but may simply utilize less bandwidth that twice that required by a single television signal if the transmission system can accommodate the greater bandwidth.

Broadly, the method herein comprises novel encoding of both televisioned programs to be multiplexed, the transmission of the multiplexed signal, and novel decoding of the received signal, either at the end of the transmission list (such as a ground station) or at the location at which the program(s) is to be viewed.

The encoding of each NTSC television program can be best explained by reference to a single frame of one program. That frame is composed of interlaced odd and even fields. Accordingly, a line in one field is spatially interjacent to a pair of lines in the alternate field; however in the time domain, all the lines of one field are produced before the lines of the second field.

In accordance with the invention, a frame of a program is encoded by pairing the lines of the odd and even fields to form a plurality of line pairs. Preferably, each line pair is formed from a line in the odd field together with the vertically adjacent line in the even field which has the same color phase.

Once the line pairs have been defined, a "composite sum" signal is produced. The composite sum signal is proportional to the sum of the video line signals for the respective line pair. Because the line signal of an odd field line is added to the line signal of the vertically adjacent even field line having the same color phase, the addition does not eliminate the color signal. Further, as those skilled in the art recognize, the addition of signals does not cause an increase in bandwidth.

Similarly, a composite difference signal for each line pair is produced. The composite difference signal is proportional to the difference of the line signals associated with the paired field lines. The composite difference signal of each line pair is low pass filtered, thereby decreasing its bandwidth, and time compressed. Although the tim e-compression increases the bandwidth of the composite difference signal, the degree of compression is balanced by the amount of filtering so that the bandwidth does not exceed the original bandwidth. Preferably, the cutoff frequency of the low pass filter is 1.05 MHz, permitting a compression of 4.

Synthesized line signals are formed from the composite sum and compressed composite difference signals. Preferably, the composite sum signal of a given line pair is joined sequentially with the composite difference signal of the same line pair. The reader will appreciate that the information for an entire frame is represented by a plurality of the aforementioned synthesized line signals, and that there are approximately half as many synthesized line signals as frame lines. Stated another way, there are approximately the same number of synthesized line signals as there are field lines. Accordingly, a frame of video information of one program may be transmitted alternately with a frame of video information from a second program, with the total transmission time of both frames occupying the time and bandwidth allotted to transmission of a single frame in the NTSC system.

In accordance with the invention, the length of the synthesized line signals need not be the "standard" length of 63.5 microseconds, but may instead be longer in duration than the NTSC line signals, but fewer in number.

The multiplexed signal comprising a succession of the synthesized line signals of both programs is transmitted over standard t.v. channels via terrestrial or satellite communication links. The multiplexed signal can be decoded, and the two programs reconstructed, either at the termination of the communication link which receives the broadcast or at the site at which one or both programs are to be viewed.

The decoding process can best be explained by reference again to the frame of one of the programs to be reconstructed. The composite sum signal of a line-pair is added to the composite difference signal of the line pair to recover the information for one of the field lines. Thus, ½(line 1+line 2)+½(line 1−line 2)=line 1;

Similarly, the composite sum and composite difference signals of the line pair are differenced to obtain the other field line of the frame. Thus, ½(line 1+line 2)−½(line 1−line 2)=line 2

Both the addition and differencing decoding processes take place after the difference signal has been time-expanded.

In an NTSC broadcast system, the baseband video portion of a television signal is allocated a 4.2 MHz bandwidth. The multiplexer system to be described below is adapted to compress sufficient video information from two television signals into a 4.2 MHz bandwidth multiplexed signal, thereby enabling both television programs to be reconstructed at the receiving end. In addition to having substantially the same 4.2 MHz bandwidth as a single standard video signal, the transmitted signal has substantially the same spectral energy distribution, thereby preserving the signal-to-noise ratio through satellite and other transmission links.

FIG. 1 is an illustration of the fundamental operation of a multiplexing system constructed in accordance with the invention. The video frames 1, 2 of a pair of television signals, are coupled into a multiplexer 3 constructed in accordance with the invention. Each of the signals is a standard NTSC signal of the type used for color transmission in the United States, Japan, and a number of other countries. Accordingly, each signal has a standard 4.2 MHz baseband bandwidth.

The multiplexer 3 combines the information in both frames to a single multiplexed output signal 4 having the same 4.2 MHz bandwidth normally required by either of the input signals. In the case of a satellite transmission system, The multiplexed signal is transmitted to a ground station 5 for uplinking to the transponder of a communications satellite 6. The satellite 6 retransmits the multiplexed signal to a second ground station 7, and the multiplexed signal is decoded by a decoder 8 to reconstruct the two frames of each program. The decoder 8 may be located at the ground station, at the location where at least one of the multiplexed programs is to be viewed, or anywhere in between.

Figure 2A:
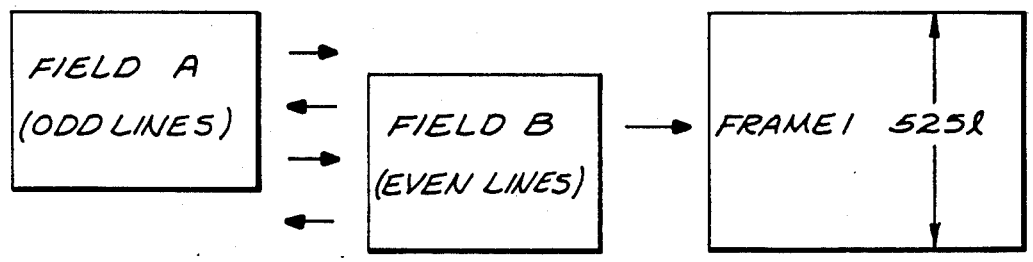
FIGS. 2A and 2B are respectively front elevation and side elevation views in schematic of the pictoral components of frame 1 in FIG. 1.
Figure 2B:
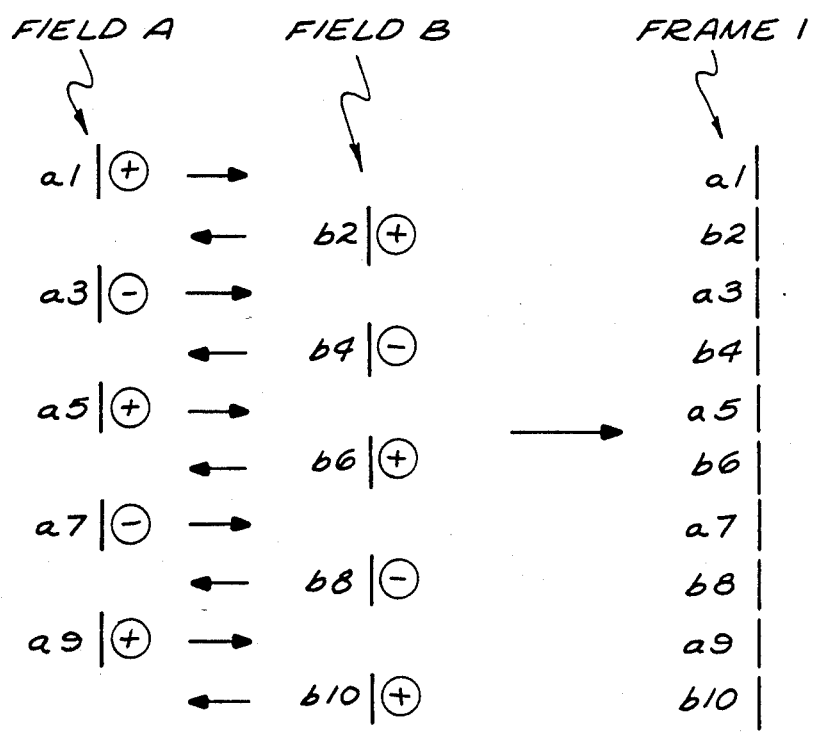

Attention is initially directed to frame 1 and to its pictoral components, so that the operation of the multiplexer can be explained. FIGS. 2A and 2B respectively provide front elevation and side elevation views, in schematic, of the pictoral components of frame 1. An NTSC television picture, or frame 1 is shown to comprise 525 lines, each line, in turn, comprising 910 picture elements, or pixels when sampled at exactly four times the color subcarrier frequency.

The frame 1 is formed by two alternatively displayed fields A, B. Field A includes all of the odd lines in the frame, while field B includes all the even lines in the frame. Accordingly, field A is illustrated as comprising lines a1, a3, a5, ... a9 while field B comprises lines b2, b4, ... b10. Those skilled in the art recognize an NTSC frame has 525 lines, with lines a263 and b2 being ½ line in length.

As shown in FIG. 2B, the color phase of adjacent lines of a field are of opposite phase. For clarity, each video line in FIG. 2B is identified by a circled algebraic sign indicative of the relative color phase of that line.

Figure 3:
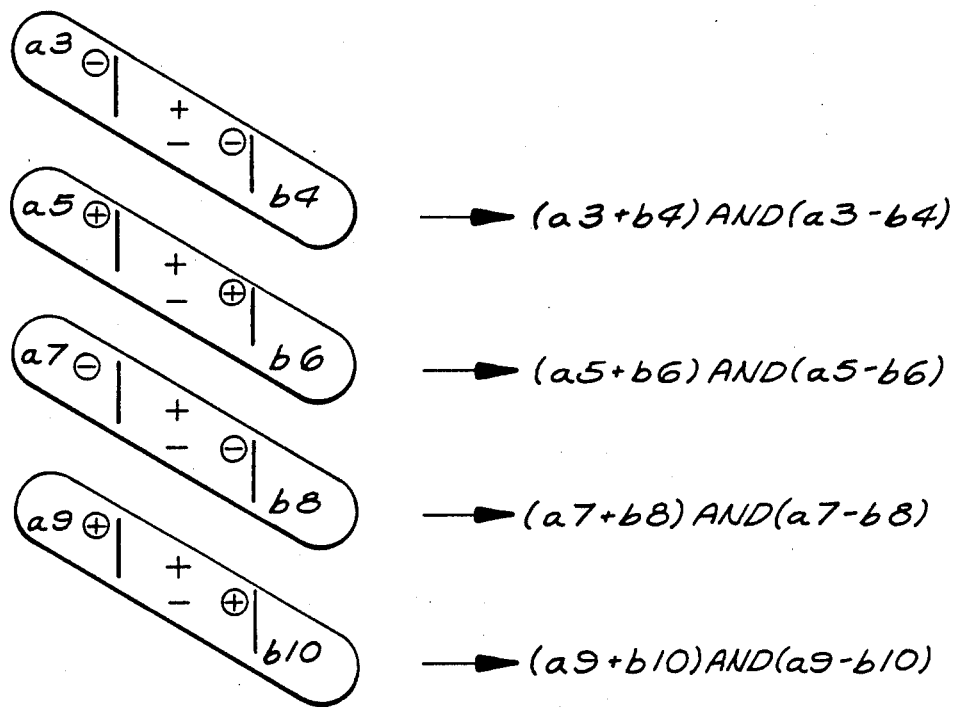
FIG. 3 is a pictoral representation of the defining of paired lines and the composite sum and difference signals in accordance with the invention.

Turning to FIG. 3, which is a schematic representation similar to FIG. 2B of an end view of an NTSC video display are pictorally illustrated so that multiplexer's signal processing of program 1 can be explained. In the first multiplexing step, the vertically adjacent lines in the odd and even fields of each frame are summed and differenced in pairs having the same color phase. Accordingly, line a3 is summed and differenced with line b4 to form composite sum signals (a3+b4) and composite difference signal (a3−b4). Similarly, line a5 is sum med and differenced to obtain composite sum and difference signals (a5+b6) and (a5−b6), respectively, for that line pair.

It can be incidentally noted at this point that lines a3 and b4, or example, may be reconstructed quite simply by summing and differencing the related composite signal. Accordingly:

((a3+b 4)+(a3−a4))/2=a3  (Eq. 1)

((a3+b 4)−(a3−b4))/2=b4  (Eq. 2)

One may observe from the foregoing equations that the adjacent lines of both fields of a video frame can be reconstructed from the "sum" and "difference" signals.

By transmitting both of these composite signals for each line pair, both fields can be reconstructed.

In order to multiplex two television programs all the composite signals for a frame of program #1 and all the composite signals for a frame of program #2 are sent during the time allotted by NTSC standards for a single frame. Accordingly, the multiplexer next arranges the two frames of information into a format which requires only a NTSC frame time to transmit; i.e., 1/30 second. The formatting of the multiplex signal for transmission is best explained by reference to FIGS. 4A–C.

Figure 4A:
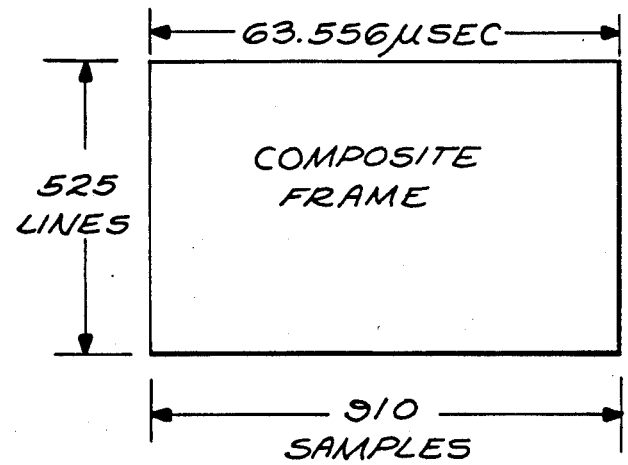
FIG. 4A–C illustrate the NTSC format compared with the format of a preferred multiplexing system.
Figure 4B:
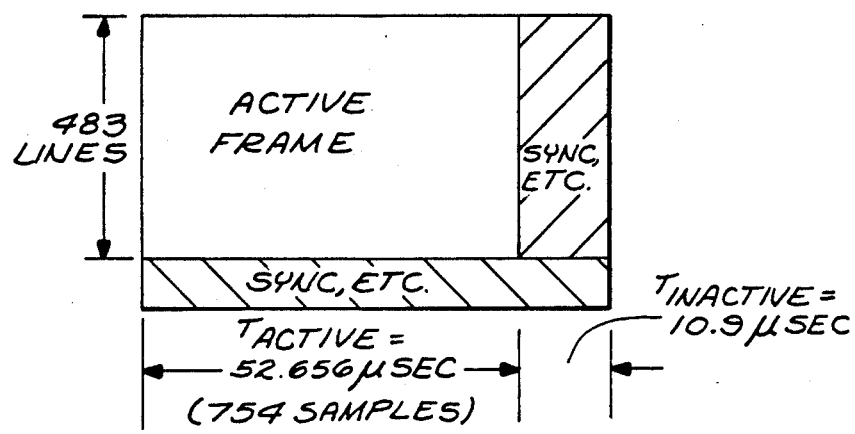
Figure 4C:
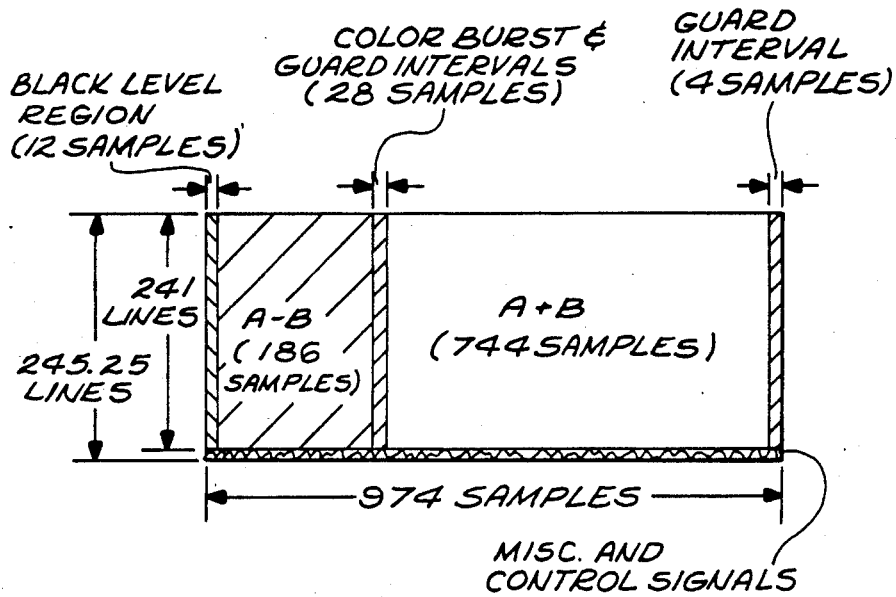

FIGS. 4A and 4B pictorally illustrates the standard NTSC format, while FIG. 4C illustrates the format utilized in accordance with the invention. Turning first to FIG. 4A, an NTSC frame is seen to comprise a matrix of 525 lines by 910 picture elements when sampled at exactly four times the color subcarrier frequency (i.e. 4 fc.), as hereinafter assumed. Each frame line is scanned in 63.4 microsec. As those skilled in the art know, only a portion of the frame represents displayed data.

FIG. 4B shows that a video frame comprises an active region comprising 483 lines, each of which is scanned in approximately 53 microsec. During the active portion of the frame, the video signals contains luminance information which modulates the scanning beam as it strikes the phosphors of the picture tube.

The remaining 10.9 microseconds comprises a blanking interval During the inactive portion, or "blanking interval" of the frame, the video scanning beam is blanked and vertically and/or horizontally retraced. During these period signal comprises the blanking, retrace, color burst, and sync signals. Accordingly, there are periods of time in the transmission of each frame which are not used for picture presentation.

FIG. 4C illustrates a synthesized "frame" having a new format in accordance with the invention. As illustrated, the format comprises a lesser number of longer lines when compared to the standard format in FIG. 4A. Accordingly, the total time required to transmit the composite frame (i.e., a frame of the composite sum and difference signals) is essentially the same as the total time for transmitting a single NTSC field.

In the preferred embodiment, the novel format includes 241 lines of information (compared to 241.5 field lines in the standard active region of an NTSC frame). Each line, however contains sufficient information to substantially reconstruct both paired video lines. Accordingly, one synthesized line is equivalent to two NTSC lines of information.

The composite sum signal occupies 744 pixels of time, compared to 746 in the standard active region. In essence, the composite sum signal (a+b) occupies approximately the same amount of horizontal scan time as the standard active region. The composite difference signal (a−b) occurs during the remaining portion of the new horizontal line time.

Since there is insufficient time to send the entire composite difference signal (a−b), it is bandlimited and compressed so that sufficient information is transmitted to enable reconstruction of the two television frames without noticeable artifacts. Since time compression increases bandwidth, the composite difference signal is first low pass filtered to reduce its bandwidth to ¼ of its original value. The signal is then sampled at the same rate as the sum signal and time compressed by a factor of 4, by using every 4th sample and transmitting those samples at the same rate as the rate of transmission of the sum signal. The time compression increases the bandwidth of the difference signal back to its original, and permissible, value.

Figure 5:
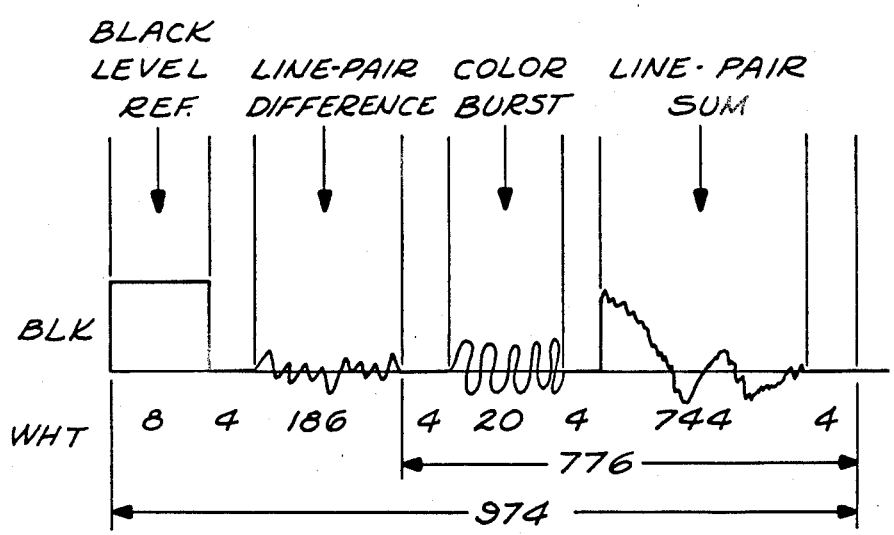
FIG. 5 is a schematic illustration of a synthesized line waveform produced in accordance with the invention.

FIG. 5 is a schematic illustration of a synthesized line signal produced in accordance with the invention. The synthesized line signal commences with a "line initiation pulse", in the form of a black-level reference pulse, signifying the beginning of a synthesized line signal. The pulse is 8 pixels (or clock pulses) of time in duration. The pulse is followed by a guardband of 4 pixels worth of time, and a composite difference signal of the appropriate line pair. The composite difference signal occupies 186 pixels worth of time and is followed by a 4 pixel guardband. A shortened color "burst" of 20 pixels follows, together with another 4 pixel length guardband. The composite sum signal, occupying 744 pixels worth of time, together with a final 4 pixel guardband completes the synthesized line. There are accordingly 974 pixels per synthesized line, and 241 synthesized lines provide a compressed frame of one video program.

The standard NTSC format comprises 477,750 pixels per frame at the 4 fc sampling rate. Accordingly, the multiplexing system herein must transmit two compressed frames of information (i.e., one from each program) within 477,750 clock pulses, or pixels. Since each synthesized line requires 974 pixels, 490.5 lines can be accommodated.

As indicated above, the system produces only 482 synthesized lines to transmit a compressed frame of each video program. Accordingly, 8.5 new lines are still available for frame sync information, VIR, and closed caption.

The system utilizes an encoder and a decoder. The preferred encoder accepts two frame-synchronized standard NTSC video signals, converts them into digital form by means of A/D converters, packs the two pictures and reconverts the multiplexed signal to analog form for transmission.

THE DECODER

Figure 7:
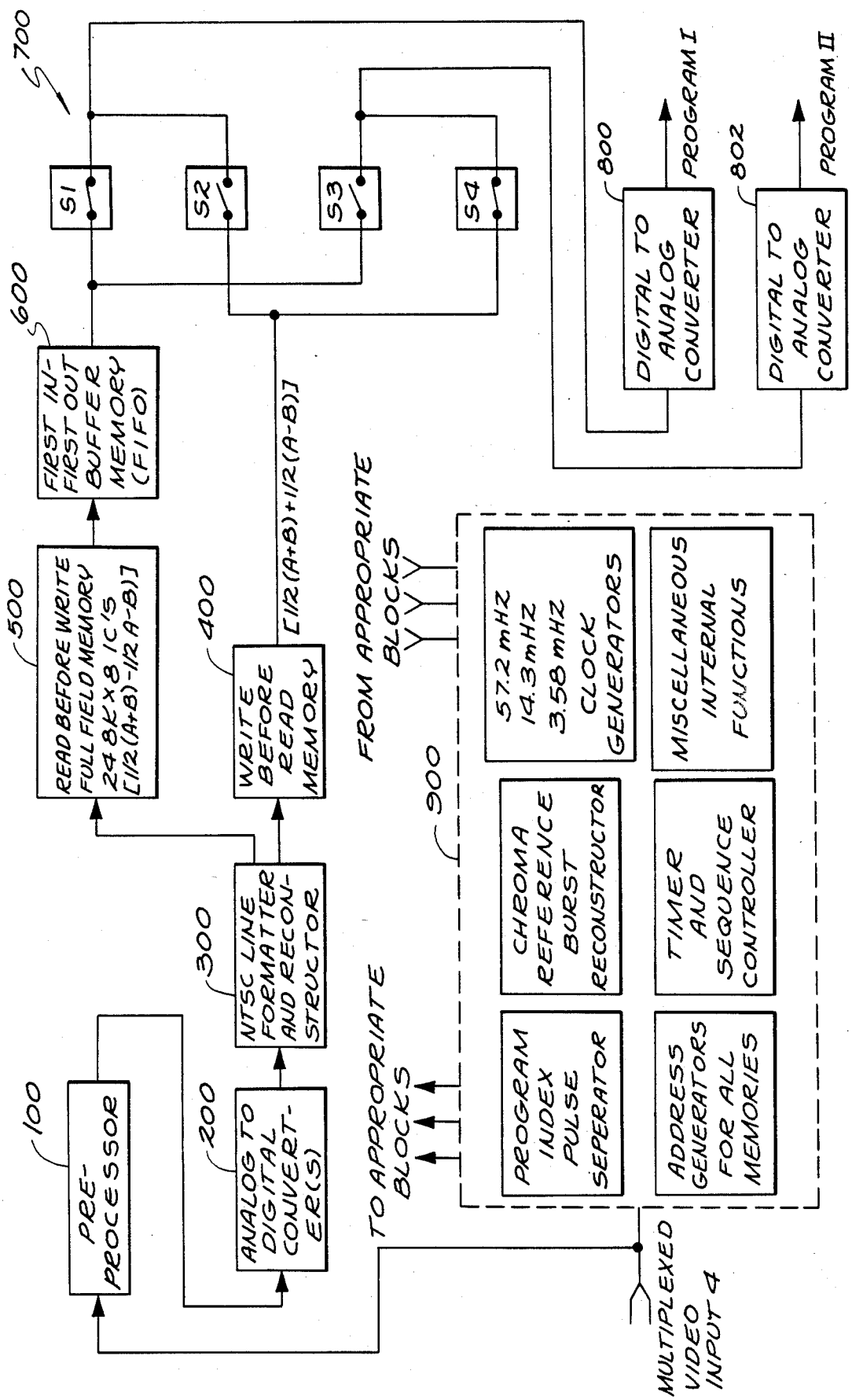
FIG. 7 is a block diagram representation of a decoder constructed in accordance with the invention.

FIG. 7 is a functional block diagram of a decoder constructed in accordance with the invention. The decoder comprises a preprocessor 100 which receives the multiplexed video input signal (FIG. 5) and processes it for digitizing by the analog-to-digital converter means 200.

As shown in FIG. 5, the difference signal portion of a particular line pair signal is presented to the input terminal of the decoder prior to the sum signal portion of that line pair. The difference signal portion is sampled and held until the sum signal portion is digitized, whereupon the sum and difference signals can be added and subtracted on sample by sample basis to reconstruct the original video frame.

Because there are only ¼ the number of samples of difference signal as there are samples of sum signal (owing to the time-compression of the difference signal in the encoder), the number of sum and difference samples must first be equalized. Accordingly, as will be described in greater detail later, the effective sampling rate of the converter 200 is four times greater during the sampling of the difference signal than during the sampling of the sum signal. The difference signal can thereby be time-expanded because there are an equal number of samples for both the sum and difference signal.

As the sum signal of a line pair is digitized, the NTSC line reconstructor 300 both sums and differences the sum signal values basis. with the difference signal values on a sample by sample As will be explained, reconstructed values of one video line (i.e., the line of frame A) are stored in WBR memory 400, while the recovered values of the other video line (i.e., that of frame B) are stored in RBW memory 500.

In the embodiment illustrated in FIG. 7, the field lines recovered by adding the sum and difference signals are stored in WBR field memory 400. For convenience, this field will be referred to as the "A" field. In operation, the data for the "A" field is written into the memory 400 as it emerges from the reconstructor. After approximately 17 NTSC lines of the program field have been written, the written data begins to be read out for outputting from the decoder during the same field interval in which it was decoded. For the duration of the field interval, written field "A" data is read out while incoming data for the later-arriving lines of the field are written into the memory 400. The later arriving data is stored in locations from which data for the field has already been read out.

To understand the function of memory 400, it is helpful to remember that the time in which an NTSC line of data is written into memory 400 is different than the amount of time in which the same line is read out, owing to the difference in formats between the multiplexed input signal and the NTSC line. The incoming field data is encoded as part of the line pair signal 4, which (as illustrated in FIG. 5) comprises 974 sample intervals of time. Accordingly, each write cycle is 974 samples in duration. By contrast, a standard NTSC line comprises 910 sample intervals. Since data is read from memory at the NTSC rate, the write cycle is longer than the read cycle for a line of data. By commencing the write cycle sufficiently prior to the beginning of the read cycle, the written data is not overtaken by the read data during outputting of the video field.

Figure 11:
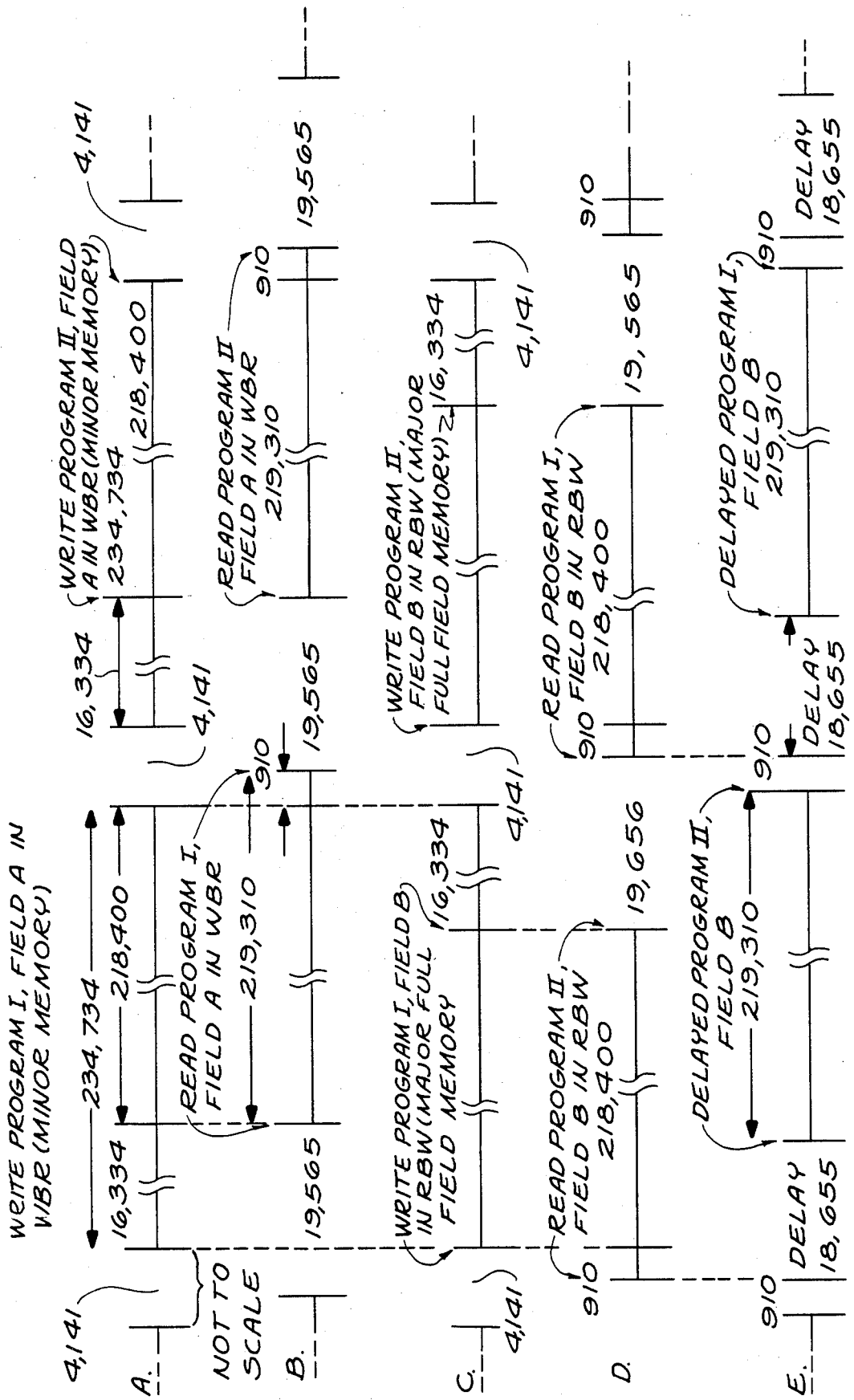
FIGS. 11–12 are alternative timing diagrams illustrating the sequence of memory operations in a decoder constructed in accordance with the invention.

The interaction of the read and write cycles for the WBR memory 400 is most easily explained by brief reference to FIG. 11. FIG. 11 illustrates the timing relationship between the read and write operations of the memories. Turning initially to time line "A", the write cycle of the WBR memory 400 is shown to comprise 234,734 sample periods. This is the equivalent of 241 multiplexed lines, each containing 974 samples. (See FIG. 4C The active write intervals of the WBR memory 400 are separated by a time interval equivalent to 4,141 sample periods. During the separating interval, non-image data such as cueing signals, VIR commands, and closed captioned material are transmitted. Additionally, the separating intervals contain signals necessary for multiplexer operation, such as program index pulses and additional chroma subcarrier reference bursts.

Accordingly, time line "A" shows field A of program #1 being written during a first active write interval, followed by an intervening interval having a duration of 4,141 samples, and a second write cycle of 234,734 sample intervals during which field A of the second program is written.

The active write intervals are conveniently divided into two subintervals of 16,334 sample intervals and 218,400 sample intervals respectively. The shorter interval is equivalent to 16.77002053 multiplexed lines in duration, and represents the necessary time delay required before th read cycle begins.

Time line "B" shows the read cycle for the WBR memory 400 in relationship to the write cycle. The read cycle is 219,310 sample intervals in length. As indicated above, the data is read out in the NTSC format. Accordingly, the read cycle is 241 NTSC lines in length.

The write cycle is shown to terminate exactly 910 sample intervals (i.e., one NTSC line) before the read cycle ends. Because the write cycle ends exactly one NTSC line before the last line is read out, the last line is fully stored before its readout commences. Accordingly, all data for frame A is written before the read cycle overtakes the write cycle by reading memory locations which have not yet been written into for the video frame under consideration. The read cycle intervals are shown to be separated by 19,565 sample intervals. This is exactly 21½ NTSC lines, the vertical blanking period.

Although details concerning the memory configuration are discussed later in this specification, it is clear from FIG. 11 that WBR memory 400 is written into prior to being read from, and that the reading and writing operations occur simultaneously once the read cycle has begun and until the write cycle terminates.

The field data stored in the WBR memory 400 is outputted from the decoder almost simultaneously with its production by the reconstructor 300. Thus, in summary, the composite frame of one program, which has been applied to the input of the decoder during an NTSC field interval, has accordingly been decoded into its two fields during that field interval. During that field interval one of those two fields (e.g., field "A") had been written into WBR memory 400 and almost immediately read from that memory 400 for outputting from the decoder. During the next field interval, and as shown by time-line "A" of FIG. 11, the field data from one field (e.g., field "A") of the other program is written into, and read out of, the memory 400 in the same manner.

The outputting of the second field of the first program during that next field interval is accomplished via RBW memory 500. While the WBR field memory 400 is receiving the data for the reconstructed NTSC lines of one field, the data for the other reconstructed field is being applied to the RBW memory 500. Unlike the data from the first field, which is almost immediately outputted from the decoder, the data in the RBW memory 500 is held until completion of the read-out from WBR memory 400. For convenience, it is assumed that the delayed field is field "B".

Assuming that frame B of program #1 is under consideration, it must first be understood that field B data from program #2 (stored during the previous field interval) must be read out of RBW memory 500 while the new data is written. By the way of examination, a compressed frame of program #2 had been decoded by reconstructor 300 during the previous field interval. The reconstructed "A" field of that frame had been stored briefly in WBR memory 400, as previously described, for almost immediate outputting. The "B" field of program #2 had been stored in RBW memory 500 for outputting during the next field interval; i.e., the interval now under consideration.

To prevent unread data from being overtaken and replaced by the new data, the reading of previously stored data (of program #2) must be commenced sufficiently prior to the commencement of the write cycle associated with the income data (from program #1). Because the Read cycle takes 910 sample periods, while the write cycle takes 974 sample periods, a read cycle "head start" of 1 NTSC line interval (910 sample intervals) is sufficient.

Returning briefly to FIG. 11, time line "C" illustrates the write cycle associated with the RBW memory 500. As expected, the write cycle commences and terminates at the same time as the write cycle associated with WBR memory 400 (time line "A") since the reconstructor is producing reconstructed data for both fields during that interval.

Turning to time line "D" of FIG. 11, the read cycle of RBW memory 500 is shown. The previously stored data from field "B" of program #2 commences 910 sample intervals prior to the beginning of the write cycle (time line "C"). Since the read cycle begins exactly one NTSC before the write cycle it terminates exactly 16,344 sample intervals before the write cycle.

Returning to FIG. 7, data read from the RBW memory 500 is applied to the input of a first in, first out (FIFO) buffer 600, which provides proper time-alignment between the read data from the RBW memory 500 and WBR memory 400.

Figure 12:
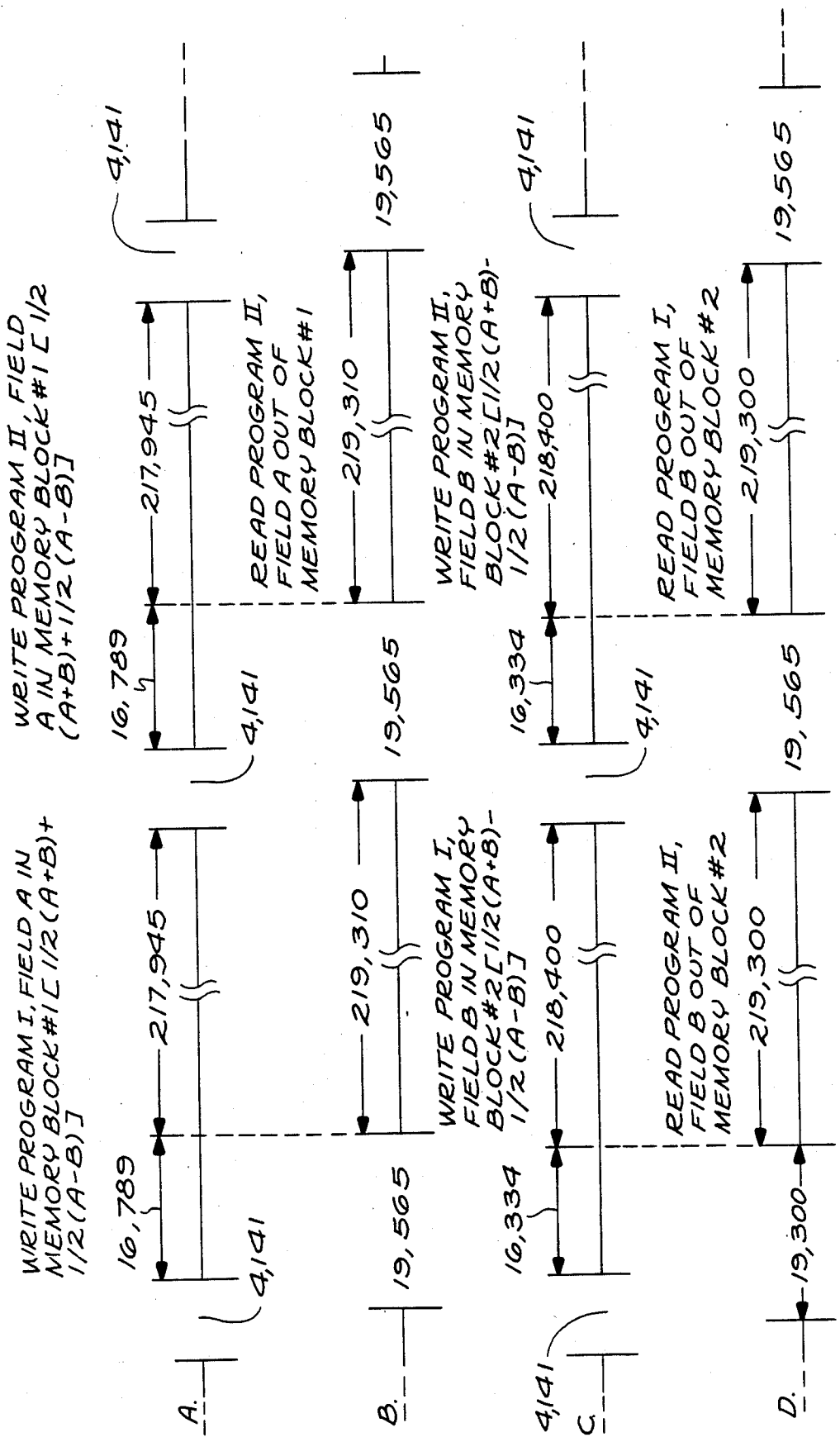

Time line "E" of FIG. 11 shows how the delay of FIFO buffer brings the read cycles for both programs and both fields into proper time alignment. The delayed field "B" of program #2 precedes field "A" of Program #1 by exactly one-half NTSC line, preserving the desired spatial relationship. Similarly, the delayed field "B" of program #1 starts one-half line before field "A" of program #2. Accordingly, the spatial relationships between field "A" and field "B" of the same program are maintained. Naturally, the function of the FIFO buffer can be incorporated into the two memory blocks by delaying the read cycle associated with the WBR memory. A representative timing diagram is illustrated in FIG. 12. return again to FIG. 7, the data emerging from each of the memories 400 and 500 alternatively relate to program #1 and program #2, respectively, since the original input signal 4 contains compressed frames of the two programs in alternate succession. Switching means 700 is operable at the field frequency rate of 59.94 Hz to accordingly switch each memory between the inputs of a pair of digital-to-analog converters which output the signal for a respective one of the two multiplexed programs. Accordingly, the output of FIFO 600 is coupled to D/A converter 800 through S1 of switch means 700, and to D/A converter 802 through switch means S3. The output of WBR memory 400 is similarly coupled through S2 to A/D converter 800 and through switch S4 to A/D converter 802. When S1 and S4 are closed, S2 and S3 are open. The second field of program #1 is thereby coupled to converter 800 while the first field of a frame of program #2 is coupled to the converter 802. During the next field interval, S2 and S3 close, and S1 and S4 open. The second field of program #2 is thereby coupled to the converter 802, while the first field of the next program #1 frame is coupled to converter 800.

Having provided an overview of the decoder, attention is next directed to the structure of the memories 400, 500 which enable data to be written into, and read simultaneously out of, each memory without iterference or overlap at any time.

Turning first to RBW memory 500, the memory is configured as three ranks a, b, and c. Each rank comprises eight 64 k (8 k×8) chips Each chip requires a cycle time of 140 nanoseconds. The data each NTSC field line is arranged by rank as shown in FIG. 13.

As previously described, the read cycle associated with the field data of a program commences 910 sample intervals before the write cycle of the corresponding field of the other program. The read cycle ends exactly 219,310 sample periods (241 NTSC lines) later. The end point of the read cycle is 224 sample periods into the 225th line of the write cycle.

Consequently, the first reconstructed NTSC line of data is written into chip A, the second line into B, and so forth until line 16. Since the write cycle commences 1 NTSC line after the read cycle commences, data is being read from rank B at the time that line 1 of the newly arriving field is written into Rank A. Because the write cycle is longer than the read cycle, the data for old line 2 is read out before the data for new line 1 has been completely written in. Thus, by the time data for new line 2 is to be written into rank B, data for old line 3 is already being read out of Rank C.

The address of the written location continues to fall further behind the address of the read location until, by line 17, it is possible to store two video lines in the same rank without the write cycle attempting to access the same location from which data is being read. As the write cycle falls further and further behind the read locations in the sequential addressing of the memory, more and more video lines may be written into the same rank. In this way, new data is never written into a location from which old data remains unread.

Turning to WBR memory 400, the memory need only store nine lines. In practice, there are no memory chips presently available which can store that amount of data and still be capable of operating sufficiently fast to allow simultaneous read and write operations to be accomplished in less than 70 nanoseconds (the period of one sample).

Accordingly, the memory 400 is also configured in three ranks, each rank comprising two 64 k (8 k×8) chips. Each chip requires a cycle time of 140 nanoseconds. Labeling the ranks a, b, and c, data for the NTSC video lines is arranged as shown in FIG. 14.

Because the write cycle is longer in duration than the read cycle for an NTSC line, an almost inverse strategy compared to memory 500 is employed. The first 7 NTSC lines are stored in Rank A, the next 9 in Rank B, the next 8 in rank c, and so forth as illustrated. As the shorter read cycle of each NTSC line catches up to the locations into which data is being simultaneously written, fewer lines are stored in each rank. Thus, by the time that line 240 is being read out of rank a, line 241 is being written into rank b, just slightly ahead in the accessing sequence.

Having discussed the structure of the memories 400, 500, attention next directed to the converter 300. As indicated previously, the converter 300 is configured to sample the incoming line-pair difference signal at one effective rate in order to time-expand the difference signal back to its initial, pre-encoded time-base, and the remaining uncompressed input signal at a second effective rate. There are a number of alternative embodiments for accomplishing the dual-rate function.

Figure 8:
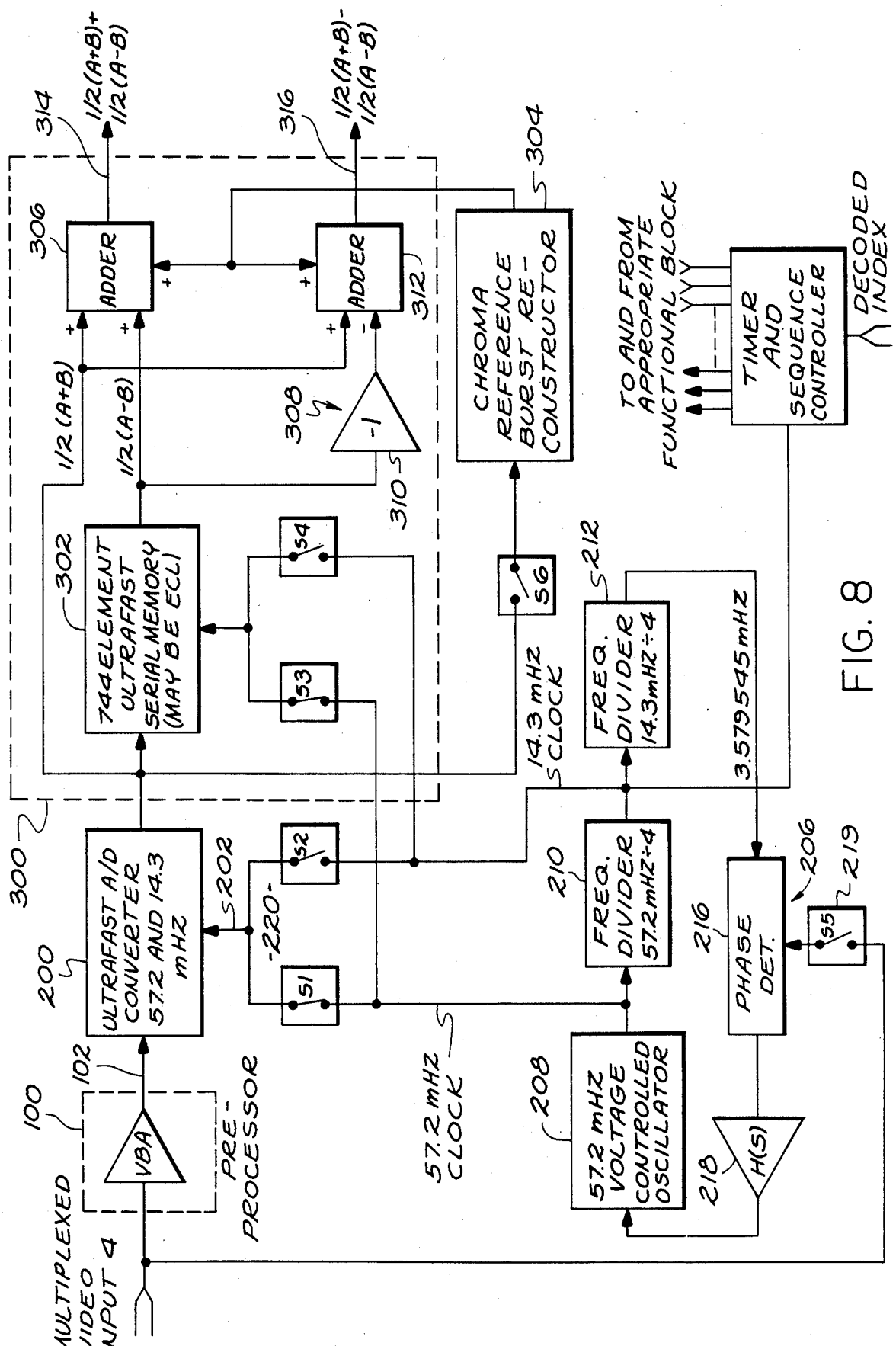
FIGS. 8–10 are block diagram illustrations of alternative embodiments of a decoder constructed in accordance with the invention.

FIG. 8 is a block diagram of a decoder configuration utilizing an "ultrafast" analog-to-digital converter. As illustrated in FIG. 8, the multiplexed input signal 4 is applied to the input of the preprocessor 100 which, in the illustrated embodiment is simply a unity gain video buffer amplifier (VBA).

The output signal 102 from the preprocessor 100 is digitized by an analog-digital converter capable of sampling the signal 102 at a rate of 57.2 MHz. The converter 200 is clocked by clock generator 206. The generator 206 comprises a voltage-controlled oscillator 208 and a pair of frequency dividers 210, 212 serially coupled to the output of the oscillator 208. Each of the frequency dividers 210, 212 produces a respective output signal having ¼ the frequency of its respective input signal. The input of the oscillator 208 is coupled to a phase detector 216 via a loop filter 218.

In operation, the phase detector 216 is coupled to the multiplexed input signal 4 via switch means 218 as the shortened color burst (FIG. 5) of the input signal is applied to the decoder. The phase detector 216 utilizes the chromo burst and the output frequency of the second serially connected frequency divider 212 to lock the voltage-controlled oscillator 208 in frequency and phase to the fourth harmonic of the received color burst. Accordingly, signals having frequencies of 57.2 MHz, 14.3 MHz and 3.58 MHz are available from the outputs of the oscillator 208, first frequency divider 210, and second frequency divider 212, respectively.

The digitized signal from the converter 200 is held by a memory 302 within the NTSC line formattor and reconstructor 300. Both the converter 200 and the memorny 302 are clockable at two rates: namely 57.27 MHz while converting the time-compressed, line-pair difference signal, and at 14.3 MHz when sampling and holding the remainder of the multiplexed input signal 4.

Accordingly, switching means 220 is operable to connect the converter 200 and memory 302 to the output of the voltage controlled oscillator during the sampling and holding of the line-pair difference signal portion of the multiplex input signal 4. Switching means 220 is then operable to connect the converter 200 and memory 302 to the 14.3 MHz output of the first serially connected frequency divider 210 to clock the remaining components of the input signal 4 at ¼ the 57.27 MHz rate.

The memory 302 stores the digitized data serially so that it is available later in serial form. The memory is 744 elements in length, and 8 bits wide. Alternatively, it may utilize a serial in parallel-out configuration to stack the 8 bit data stream into a slower, 64 bit data stream which can be stored in a relatively slower 93×64 memory. Such data can then be read out through a parallel-in serial-out device to reconvert it into a fast, 8 bit data stream.

When switches S1 and S3 are closed, the memory and converter operate at their maximum speed, being clocked at a rate of 57.27 MHz. They operate at this speed only while converting a time compressed difference signal, converting it into 744 8-bit samples. Each sample is stored in the serial memory in real time. Each sample has a duration of 17.46 nanoseconds. Upon completion of the digitation and storage of all 744 samples of the difference signal, switches S1 and S3 open.

Following the difference signal, the shortened color burst is received at the decoder's input. Switch S2 closes, clocking the converter 200 at a reduced speed of exactly ¼ the prior rate. The 14.3 MHz clock speed causes the converter to convert the five cycles of color reference burst into exactly 20 samples, which are stored in a burst reconstructor 304. Accordingly, switch means S3 opens and S6 closes to couple the output of the converter 200 to the input of the chroma reconstructor 304. The purpose of the reconstructor 304 is to lengthen the burst to its proper NTSC length of 9 cycles for subsequent storage and insertion into the reconstructed NTSC output signal from the decoder.

The next-arriving component of the input signal 4 is the line-pair sum signal. As the sum signal is applied to the decoder input, switching means S4 closes, to permit the clocking out of the held difference data from the serial memory 302. As the converter 200 digitizes the sum signal, the digitized sum signal, and the difference data from the memory 302 are applied in perfect sample by sample time alignment to adding means 306 and subtracting means 308. The subtracting means 308 is formed by inverting a polarity of the held difference data by means of an invertor 310 and applying the digitized sum values and the inverted difference values to opposite inputs of a second 312.

The output signal 314 from the adder 306 comprises substantially reconstructed NTSC lines of one of the fields which form a compressed frame. The output signal 316 from the other adder 312 comprises the line signal values for the other of the fields.

The field information is accordingly applied to the WBR memory 400 and the RBW memory 500 (FIG. 7) as previously described.

Figure 9:
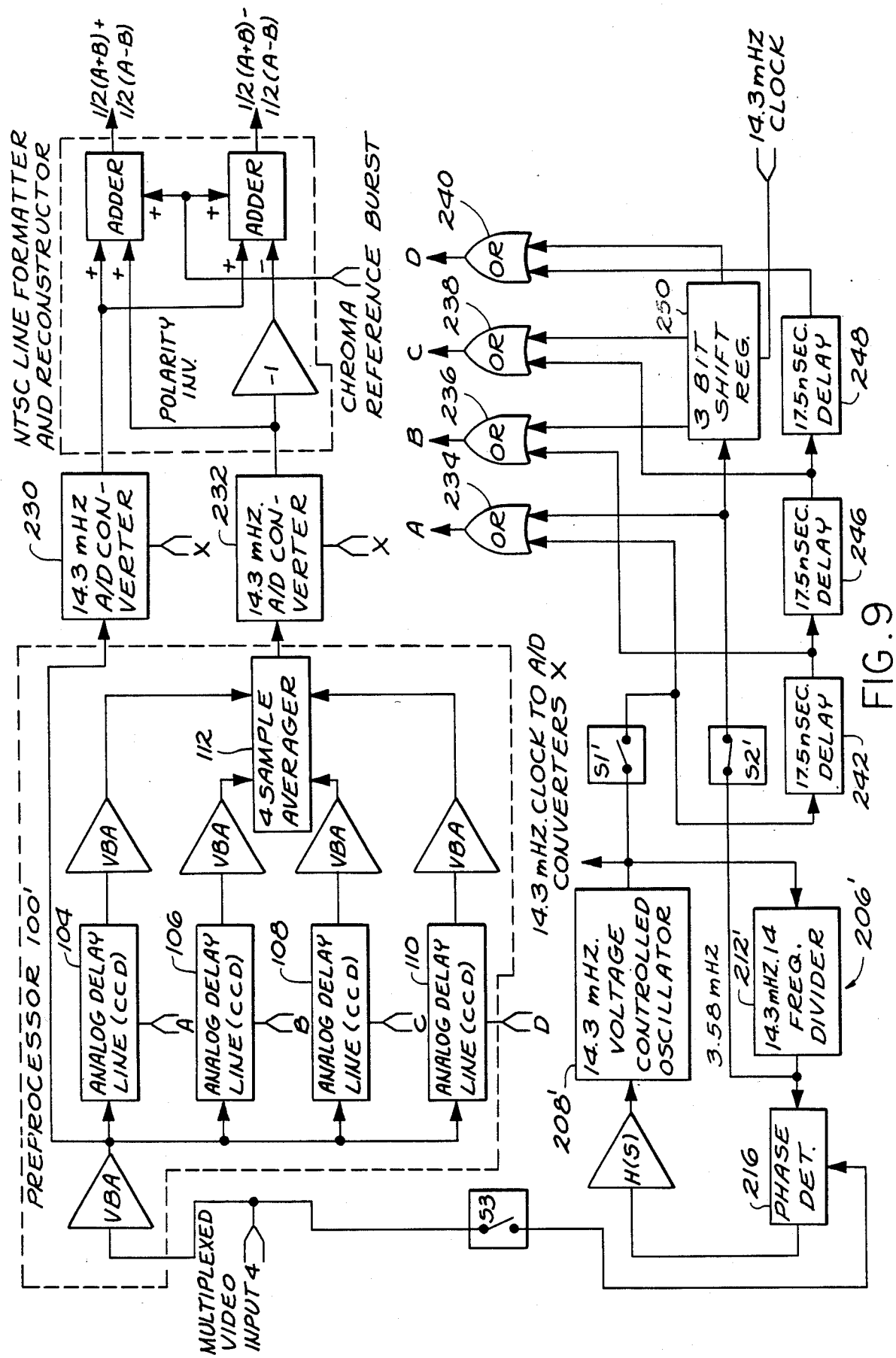

FIG. 9 shows another embodiment of the decoder which eliminates the need for analog-to-digital converter capable of 57.2 MHz sampling.

In the alternative embodiment, the multiplexed video input signal 4 is applied to a preprocessor 100' which comprises four analog delay lines 104, 106, 108, 110. The analog delay lines may, for example, be Charged Coupled Devices (CCD) or Charged Injection Devices (CID), which are inexpensive and reliable components presently available for such uses as comb filters in color television receivers and monitors. Preferably, the devices should each comprise 186 cells, and should be capable of being clocked at 14.3 MHz.

During the write cycle, each device is clocked at 14.3 MHz. The line-pair difference signal, (FIG. 5) however, is clocked at a different effective rate by uniformly skewing the signal so that the clock is essentially split into four equal phases, ninety degrees apart. The clocks are skewed relative to each other by 17.5 nanoseconds, so that the difference signal is sampled 744 times, just as though the clock frequency were 57.27 MHz.

To clock the analog delay lines 104, 106, 108, 110 in a skewed manner, the clock 206' comprises a 14.3 MHz voltage controlled oscillator 208' whose output clocks a pair of 14.3 MHz analog-to-digital converters 230, 232. Rather than a single converter 200 of FIG. 8, which is switched at one of two rates, the present embodiment comprises two A/D converters which are clocked at the same rate.

Switching means S1' couples the output of the oscillator 208' to one input terminal of an OR gate 234 which clocks the first analog delay line 104. The output of the oscillator 208' is additionally coupled via S1' to a series of 17.5 nanosecond delay lines 242, 246, 248. The delay lines 242, 246, 248 respectively couple the output of the oscillator 208' to an input of a respective OR gates 236, 238, 240, which, in turn, respectively clock the remaining analog delay lines 106, 108, 110.

When S1' is closed, the voltage controlled oscillator 208' will accordingly cause OR gate 234 to clock analog delay line 104 at a frequency of 14.3 MHz. The same pulse from oscillator 28' will experience a 17.5 nanosecond delay in delay line 242, and will thereafter cause OR gate 236 to clock delay line 106. Analog delay line 108 will similarly be clocked an additional 17.5 nanoseconds later owing the additional delay imposed by delay line 246. Similarly, the analog delay line 110 is clocked an additional 17.5 nanoseconds after the clocking of delay line 108. In this way, the difference signal has been sampled in a skewed manner at clock rate of 14.3 MHz, but at an effective rate of 57.27 MHz.

When all 744 samples of the difference have been accumulated in the four analog delay lines 104, 106, 108, 110, the sampling is terminated by the opening of switch means S1', and sampled difference information is retained until the sum signal is received and starts to be digitized by analog-to-digital converter 230. At that time, switching means S2' closes, coupling the inputs of the OR gates 234, 236, 238, 240 to the output of the frequency divider 212'. The OR gates are accordingly clocked at a 3.58 MHz frequency; namely, ¼ that of the clock rate of converter 230.

The OR gates are clocked in a skewed manner by coupling the 3.58 MHz output of frequency divider 212' into the input of a 3 bit shift register 250. The shift register 250 is clocked by the 14.3 MHz output of the oscillator 208' so that the input clock to the shift register appears at the input of OR gates 236, 238, 240 in successively lagging 90 degree shifts.

The data from the difference signal is applied to converter 232 in step with data from the sum signal applied to convertor 230, since each 3.58 MHz clock pulse causes each of the four delay line to produce a sample. The sum and difference signals are accordingly applied to adding means and subtracting means in the manner previously described so that the original NTSC lines can be reconstructed.

A four sample averager 112 is located at the output of the preprocessor 100' to effectively neutralize the slight variations in gain and DC offsets between the delay lines 104, 106, 108, 110. Ideally, the delay lines could be selected for a match in gain and DC offsets; however, selection is impractical, not only because of costs, but also because aging may cause gain or level variations over time which invalidate the initial selection process.

Non-uniformity of the delay lines is a problem because variations in output appear as signal components whose fundamental frequency is exactly equal to the NTSC chroma subcarrier frequency of 3.58 MHz. This may be appreciated by considering a situation wherein the outputs from the delay lines is ideally zero. Under such circumstances, each of the delay lines will, as a practical matter, produce a slight positive or negative voltage representing offset differences. As samples are taken from each of the four delay lines, the resultant output is a time-varying signal, rather than a signal having a value of zero. The frequency of the time-variance signal is the clock rate of 3.58 MHz.

The signal components created by the gain and offset errors are a problem because the components are decoded in a color receiver or monitor as false colors which cannot be compensated for, since the changes in hue will be functionally dependent on the instantaneous legitimate subcarrier amplitude, and thus not subject to unique correction over all colors or saturations.

By averaging the four outputs of the delay lines 104, 106, 108, 110, infinite attenuation "notches" have been placed in the transfer function of the preprocessor 100' at the chroma subcarrier frequency and all its harmonics. There are no legitimate chroma components in the difference signal because they were removed in the encoder by channel bandwidth limitations. Accordingly, any components at this frequency which are present in the difference signal are noise components resulting from unbalance and non-uniformity in the analog delay lines.

Those skilled in the art will recognize that an additional benefit accruing from the four sample averager is a six db reduction in random noise introduced by the analog-digital converters 230, 232 and/or preprocessor 100'. Consequently, however, there is a slight roll off in frequency response in the difference signal, amounting to approximately 1.2 db at 1.05 MHz (the high frequency limit of the difference signal). The roll off may be easily compensated for by a simple linear pre-emphasis filter in the encoder.

Figure 10:
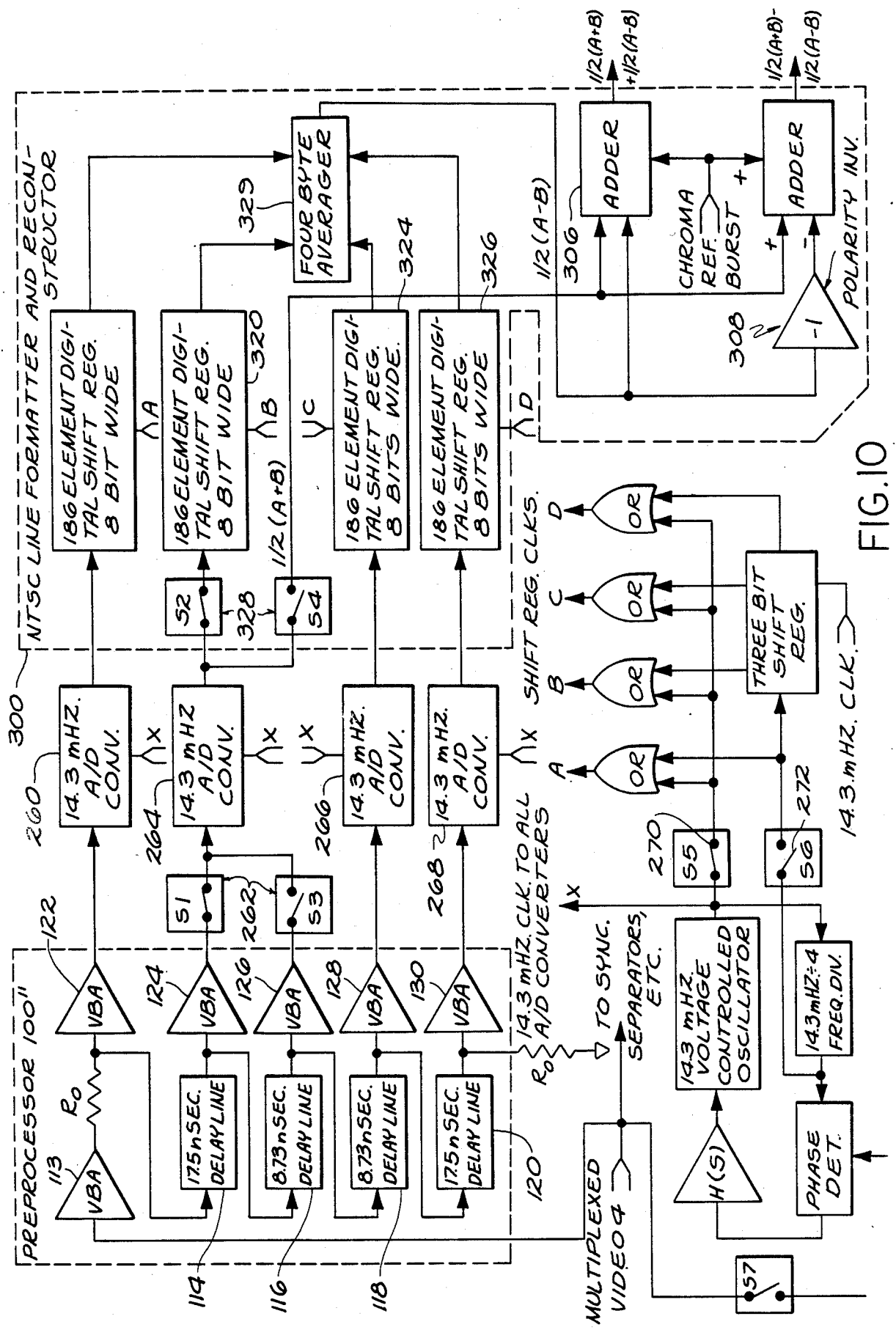

FIG. 10 is another embodiment of a decoder constructed in accordance with the invention. Unlike the embodiment illustrated in FIG. 8, the presently described embodiment utilizes four analog-to-digital converters 260, 262, 264, 266 which are clocked at the rate of 14.3 MHz throughout the digitizing of a line-pair signal. Unlike the embodiment illustrated in FIG. 9, the presently illustrated embodiment provides for the skewing of the multiplexed input signal 4 rather than the sluing of clock pulses to the preprocessor.

As illustrated in FIG. 10, the preprocessor 100' comprises an input emplifier 113 which receives the multiplex video signal 4. The input signal is then passed through a series of delay lines 114, 116, 118, 120. The output of the amplifier 113 is additionally coupled to a second stage amplifier 122 which, in turn, outputs the received signal to a first analog to digital converter to 60. Another second stage amplifier 124 is coupled to the output of the first delay line 114. A third amplifier 125 is similarly coupled to the output of the second delay line 116, while fourth and fifth amplifiers 128, 130 and respectively coupled to the outputs of delay lines 118, 120.

The first of the second stage amplifiers 122 is coupled to the input of a first analog digital converter 260. The second analog-to-digital converter 264 is selectively coupled to either one of the amplifiers 124, 126 by switching means 262. The third analog-to-digital converter 266 and the fourth analog digital converter 268 are respectively coupled to the outputs of amplifiers 128, 130.

In operation, the skewing of the input signal effectively samples it at 4 equal phases, ninety degrees apart, when the converters are simultaneously clocked.

After the difference signal portion has been sampled, the switching means 262 is operable to disconnect amplifier 124 from converter 264 and couple the input of converter 264 to the amplifier 126. The remaining portions of the input multiplexed signal is then digitized by converter 264 at the 14.3 MHz rate.

The NTSC formattor 300 in the illustrated embodiment includes four shift registers 320 322, 324, 326. During the digitizing of the difference signal, switching means 328 couples the output of the second converter 264 to shift register 320 so that the digitized values of the difference signal may be held for processing. During digitizing of the sum signal, switching means 328 decouples the operative converter 264 from the shift register 320 and couples it instead to the adding and subtracting means 306, 308 as previously described.

At the arrival of the sum signal, switch 270 opens and switch 272 closes, causing the shift registers to be clocked in a skewed manner at 3.58 MHz. A new sample of stored difference signals is delivered to the 4 byte averager 328 every 69.8 nanoseconds, effectively time expanding the difference signal back to its original period. Samples of the sum signal and samples of the difference signal arrive at the adding and subtracting means in sample-to-sample correspondence and synchronism.

THE ENCODER

Figure 6:
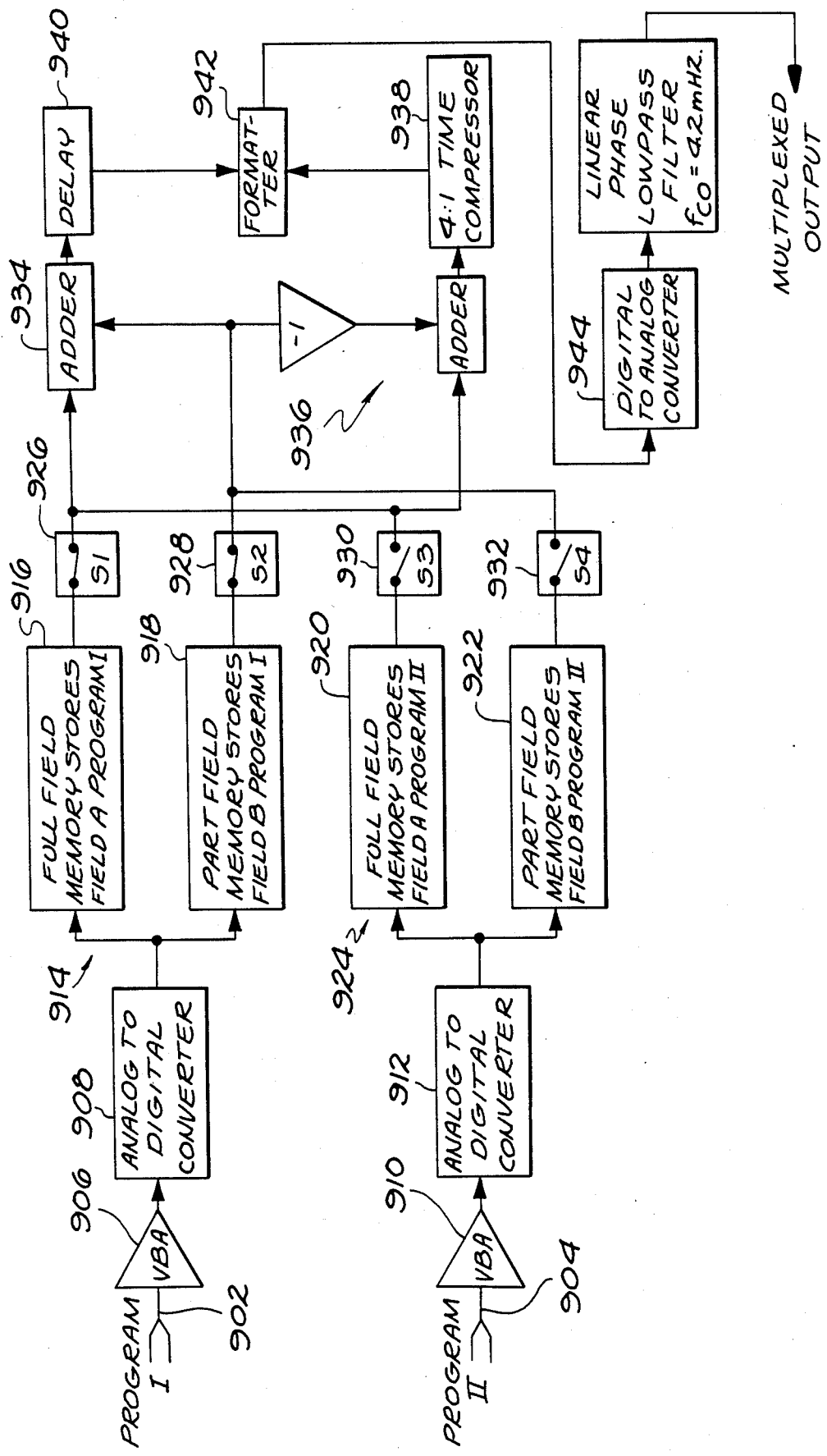
FIG. 6 is a block diagram representation of a multiplexer encoder constructing in accordance with the invention.

FIG. 6 is a block diagram of a preferred encoder constructed in accordance with the invention, is presented. The baseband video portion of the NTSC signals for television programs I and II are applied to respective inputs 902, 904 of the encoder. The signal from Program I is coupled via a unity gain amplifier 906 to analog-digital converter converted 908, which may be, for example, a single ten-bit unit operating at a sampling frequency of 14.3 MHz., or a group of four eight-bit units operating with skewed clocks and an averager similar to the arrangments and four-value averagers described above with respect to the alternative decoder embodiements. The signal from television program II is similarly applied to amplifier 910 and converter 912.

The digitized signal from program I is applied to a memory 914 comprising a FULL FIELD MEMORY 916 and a PART FIELD MEMORY 918. The first interlaced field (Field A) of program I is stored in its entirety in the FULL FIELD MEMORY 916 and is retained for the duration of field A. The memory 916 has enough capacity to store 179,304 ten-bit words, and is addressible at 14.3 MHz. Unlike the decoder memories, data is not simultaneously read and written, so the subdivision of the memory 916 into ranks is unneccessary.

The second interlaced field (Field B) of program I is stored in the PART FIELD MEMORY 918, which need have sufficient storage for a only a few lines of the field since the readout of Field B can begin after a single line of the filed has been stored. Because data is to be written into, and read out of, the PART FIELD MEMORY 918 at the same time, its is subdivided into ranks.

Program II is stored in the same manner in memory 924. System timing is such that Field A of program I is stored in FULL FIELD MEMORY at the same time that Field B of program II is being stored in the PART FIELD MEMORY 922, and vica versa.

The stored NTSC signal values for the two programs are coupled to the remaining portion of the encoder in a timely manner by operation of switch means 926,928,930,932. Switches 926 and 928 open and close together, at the NTSC field rate, as do switch means 930 and 932. Switch means 926 and 928 are closed when switch means 930 and 932 are open, and conversely.

When switch means 926 and 928 close, the signal values for fields A and B of program 1 are applied, on a sample-by-sample basis in time alignment and sychronism to opposite inputs of both an adding mean 934 and a differencing means 936. The adding means 934 produces the line-pair sum signal, while the differencing means 936 produces the line-pair difference signal.

The line-pair difference signal is applied to a 4:1 time compressor 938, which is merely a one-line memory. Information is written into the compressor 938 at a 14.3 MHz rate, and is read out at a 57.3 MHz rate, thereby time-compressing the signal by a factor of four.

The line-pair sum signal is applied to one input of formatter means 942 via delay means 940. The sum signal and chroma reference burst is delayed to re-establish the proper time relationship between all the various signals. The formatter means 942 is responsive to system timing, as detailed in copending U.S. patent application Ser. No. 808,908, to form the line-pair signals illustrated in FIG. 5 herein.

The digital line-pair signals thus formed are converted to analog signals by digital-to-analog converter 944. The resulting analog signal is outputted from the encoder through a linear phase lowpass filter having a cutoff frequency of 4.2 MHz., the standard NTSC standard. Accordingly, frequencies higher than 4.2 MHz., which are present in the time-compressed difference signal, are filtered by means of a relatively simple analog filter. The filter should have a very flat response in the passband, and a very steep cutoff characteristic.

The placing of infinite attenuation "notches" in the transfer function of the decoder's preprocessor was described earlier in this specification as a method for minimizing gain and offset errors in some of the described embodiements. Specifically, the use of a four sample averager was described. As indicated in that portion of the specification, an approximate 1.2 db rolloff resulted in the difference signal at 1.05 MHz. The described solution was the use of a pre-emphasis filter in the encoder.

In accordance with the invention, the aforedescribed pre-emphasis filter would be coupled between the difference means 936 and the 4:1 compressor 938. If an averager is used only in the decoder, a single stage is sufficient. If however, the encoder also employs an averager, a second stage of pre-emphasis filtering should be cascaded with the first.

The averager utilized in conjunction with a ten-bit signal need only accept the eight most significant bits. If an eight-bit averager is used to average four sequential eight-bit samples, bits output will have ten-bit resolution.

The pre-emphasis filter is implemented by adding the ten-bit unaveraged output from the differencer 936, amplified by a factor of 2, to the polarity-inverted output from the eight-bit averager. (The unaveraged ten-bit signal has been delayed by two sample periods to preserve linear phase.) The output from the pre-emphasis filter will have a high frequency boost of 1.1 db at 1.05 MHz., and a 6 db boost at the chroma subcarrier frequency of 3.579545 MHz. After time-compression and lowpass filtering, however, all components above 4.2 MHz (1.05 Mhz baseband) will have been removed.

While the foregoing description includes detailed information which will enable those skilled in the art to practice the invention, it should be recognized that the description is illustrative and that many modifications and variations will be apparent to those skilled in the art having the benefit of these teachings. It is accordingly intended that the invention herein be defined solely by the claims appended hereto and that the claims be interpreted as broadly as permitted in light of the prior art.

I claim:

1. A decoder for separating an encoded television frame representing odd and even field lines of an unencoded television frame, the decoder comprising:
   (a) means for receiving an input signal containing the encoded television frame comprising a plurality of sum and difference signal pairs,
      wherein each of said signal pairs comprises a sum signal indicative of the sum of respective pair of field lines of the unencoded television frame, and a time-compressed difference signal indicative of the time-compressed bandlimited difference between a respective pair of field lines of the unencoded television frame;

(b) first means for sampling and holding the sum signals of the signal pairs at a first effective rate;

(c) second means for effectively sampling and holding the time-compressed difference signals of the signal pairs at a second effective rate which is a non-unity multiple of said first effective rate to produce respective time-expanded difference signals;

(d) means for adding the sampled and held sum signals to the time-expanded difference signals to substantially recover one of the paired field lines of each of the field line pairs; and (e) means for differencing the sampled and held sum signals and the time-expanded difference signals to substantially recover the other of the field lines of each of the field line pairs.

2. The decoder of claim 1 including memory means for storing the samples and held time-expanded difference signals in uniquely addressable memory locations, and means for applying the sum signal and the stored time-expanded difference signal in a time-aligned manner to the adding means the differencing means as the sum signal is sampled by the first sample and hold means.

3. The decoder of claim 1 wherein the first and second effective rates are multiples of the chroma subcarrier frequency.

4. The decoder of claim 3 including oscillator means responsive to a signal at the chroma subcarrier frequency of a television signal to produce timing signals at respective harmonics of the chroma subcarrier frequency, and switch means for periodically phase-locking the oscillator means to the input signal.

5. A decoder for separating an encoded television frame representing odd and even field lines of an unencoded television frame, the decoder comprising:

(a) means for receiving an input signal containing the encoded television frame comprising a plurality of sum and difference signal pairs, wherein each of said signal pairs comprises a sum signal indicative of the sum of a respective pair of field lines of the unencoded television frame, and a time compressed bandlimited difference signal indicative of the time-compressed bandlimited difference between a respective pair of field lines of the unencoded television frame;

(b) first means for sampling and holding the sum signals of the signal pairs at a first effective rate;

(c) second means for effectively sampling and holding the time-compressed difference signals of the respective signal pairs at a second effective rate which is a multiple of said first effective rate to produce respective time-expanded difference signals, said multiple being proportional to the compression ratio of the difference signals to the sum signals;

(d) memory means for storing the sampled and held values of the time-expanded difference signals in uniquely addressable memory locations, (e) means for adding the sampled and held sum signals to the time-expanded difference signals for each field line pair to substantially recover one field lines of each pair;

(f) means for differencing the sampled and held sum signals and time-expanded difference signals for each field line pair to substantially recover the other of the field lines of each pair; and (g) means for applying the sampled and held sum signals and the stored time-expanded difference signals in a time-aligned manner to the adding means and the differencing means as the sum signals are sampled by the first sample and hold means.

6. The decoder of claim 5 wherein said means for sampling and holding the time-compressed difference signals includes a plurality of clocked sample and hold devices;

means for delaying the time-compressed difference signals so that the time-compressed difference signals are applied to at least some of the devices by unique delay intervals; and means for clocking each of the sample and hold devices at said first effective rate to sample the delayed time-compressed difference signals, the sum of the delay intervals being no greater than the interval between clockings of each device.

whereby values of the time-compressed difference signals which occur between clockings of one of the device are delayed and are sample at the first effective rate by other of the devices so as to effectively sample the time-compressed difference signals at a sample rate which is the multiple of the first effective rate.

7. The decoder of claim 1 or claim 5 wherein said means for sampling and holding the time-compressed difference signals includes n independently clocked sample and hold devices, where n is an integer greater than 1;

means for simultaneously applying each of the time-compressed difference signals to the n sample and hold devices; and means for clocking each of the sample and hold devices at said first effective rate, but at mutually offset times, to effectively sample and hold the time-compressed difference signals at a multiple of said first effective rate.

8. The decoder of claim 7 wherein the first sample and hold means includes means for sampling the sum signals at the first effective rate and applying the sampled sum signals to the adding and differencing means, and including means for clocking the sample and hold devices at 1/n of the first effective rate of simultaneous application of the sum and difference signals to the adding means and differencing means.

9. The decoder of claim 1 or 5 wherein said means for sampling and holding the time-compressed difference signals includes n independently clocked analog storage devices, where n is an integer greater than 1;

means for applying the time-compressed difference signals in parallel to the n storage devices; and means for clocking each of the n analog storage devices at said first effective rate, but at mutually offset times, to effectively sample and hold the difference signals value at a multiple of the first effective rate.

10. The decoder of claim 9 including means for clocking the storage devices containing the held difference signals at 1/n of the first effective rate for simultaneous application of the sum and difference signals to the adding means and differencing means.

11. The decoder of claim 1 wherein said means for sampling and holding the time-compressed difference signals includes a plurality of clocked sample and hold devices;

means for delaying the timed-compressed difference signals so that the time-compressed difference signals are applied to at least some of the devices by unique delay intervals; and means for clocking each of the sample and hold devices at said first effective rate to sample the delayed time-compressed difference signals, the sum of the delay intervals being no greater than the interval between clockings of each device, whereby values of the time-compressed difference signals which occur between clockings of one of the devices are delayed and are sample at the first effective rate by other of the devices so as to effectively sample the time-compressed difference signals at a sample which is the multiple of the first effective rate.

12. The decoder of claim 9 or claim 6 wherein the devices have offset voltages and gain characteristics which generate inequalities between a sampled input signal and the outputted held signal, and the respective offset voltage and gain characteristics of the devices are unrelated, the decoder including means for averaging each difference signal output from at least one of the device with the sequentially adjacent values from at least some of the other devices to substantially remove the harmonic component induced by any respective unrelated offset voltage or gain characteristic of the devices.

13. A decoder for separating an encoded television frame representing odd and even field lines of an unencoded television frame, the decoder comprising:

(a) means for receiving an input signal containing the encoded television frame comprising a plurality of sum and difference signal pairs, wherein each of said signal pairs comprises a sum signal indicative of the sum of a respective pair of field lines of the unencoded television frame, and a time-compressed difference signal indicative of the time-compressed difference between the a respective pair of field lines of the unencoded television frame;

(b) means for effectively sampling and holding the sum signals of the signals pairs at a first effective rate;

(c) means for effectively sampling and holding the time-compressed difference signals of the signal pairs at a second effective rate which is a multiple of said first effective rate to produce respective time-expanded difference signals;

(d) means for time expanding the sampled and held difference signals to establish a number of samples substantially equal to the number of samples of the sampled and held sum signals;

(e) means for adding the sampled and held sum signals to the time-expanded difference signals to substantially recover one of the paired field lines of each of the field line pairs;

(f) means for differencing the sampled and held sum signals and the time-expanded difference signals to substantially recover the other of the paired field lines of each of the field line pairs;

(g) first memory means having uniquely addressable locations for storing the recovered line signals for at least a portion of one of the fields;

(h) second memory means having uniquely addressable locations for storing the the recovered line signals of the other field; and (i) means for accessing the first and second memory means to output the recovered line signals for the frame.

14. The decoder of claim 13 including means for simultaneously writing first field data into said first memory means and reading said data from said first memory means, the writing being commenced before the reading, a portion of the field data being written thereafter into memory locations from which the field data has been read.

15. A decoder for separating a pair of multiplexed television programs, each program comprising a plurality of encoded television frames which respectively represent odd and even field lines of an unencoded television frame, the decoder comprising:

(a) means for receiving an input signal containing a succession of the encoded television frames, each encoded frame comprising a plurality of sum and difference signal pairs, wherein each of said signals pairs comprises a sum signal indicative of the sum of a respective pair of field lines of the respective unencoded television frame, and a time-compressed difference signal indicative of the time-compressed difference between the respective pair of field lines in the respective unencoded television frame;

(b) means for effectively sampling and holding the sum signals of the signal pairs at a first effective rate;

(c) means for effectively sampling and holding the time-compressed difference signals of the signal pairs;

(d) means for time-expanding the sampled and held difference signals to re-establish their pre-compression time base;

(e) means for adding the sampled and held sum signals to the time-expanded difference signals to substantially recover one of the paired field lines of each of the field line pairs of the unencoded television frames;

(f) means for differencing the sampled and held sum signals and the time-expanded difference signals to substantially recover the the other of the paired field lines of each of the field line pairs of the unencoded television frames;

(g) first memory means having uniquely addressable locations for storing the recovered line signals for at least a portion of one of the fields;

(h) second memory means having uniquely addressable locations for storing the recovered line signals of other of the fields; and (i) means for accessing the first and second memory means to output the recovered line signals to produce recovered unencoded frames.

16. The decoder of claim 15 including means for writing first field data into said first memory means and reading said first data from said first memory means, the writing being commenced before the reading, wherein a portion of the first field data is written into memory locations from which a portion of the first field data has been read.

17. The decoder of claim 15 including means for writing second field data of one of said programs into said second memory means and reading second field data from the other of said programs out of said second memory means, the reading being commenced before the writing, such that data from said one program is written into memory locations from which the data from said other program has been read.

18. In a video multiplexing system wherein data for each of a plurality of video frames, each comprising a first field and second field is received within a field interval during each of succession of operating cycles, and wherein each field of each frame is to be produced within a field interval during a respective one of said cycles, a method for buffering the data comprising the steps of:

(a) sizing a first memory to store at least a portion of the data from one of the fields;

(b) sizing a second memory to store substantially all the data from one of the fields;

(c) structuring the first and second memories so that each may be simultaneously written into and read from; and (d) within each said operating cycles, (1) writing the data for the first field of an incoming frame into successively addressed locations of the first memory;

(2) reading the written data for the first field from the successively addressed locations of the first memory during a field interval, the writing of the data being commenced prior to the start of the reading of the data;

(3) reading previous data which was written for a second field during the previous operating cycle from successively addressed locations of the second memory; and (4) writing the data for the second field of the incoming frame in the successively addressed locations of the second memory from which the previous data has been read.

19. The method of claim 18 including the step of arranging the incoming data in each memory among a plurality of chips so that no chip must be simultaneously read from and written into during the operating cycle.

20. The method of claim 19 further including the steps of;

cyclically addressing a plurality of the chips of the first memory during a respective portion of each operating cycle;

writing data for at least one of a plurality of successive field lines into each chip of the first memory during each addressing cycle;

wherein the number of the field line stored during ones of the addressing cycles is smaller than the number stored during previous addressing cycles of the respective portion.

21. The method of claim 19 further including the steps of;

cyclically addressing a plurality of the chips of the second memory during a respective portion of each operating cycle;

writing data for at least one of a plurality of successive field lines into each chip of the second memory during each addressing cycle;

wherein the number of field lines stored during ones of the addressing cycles is larger that the number stored during previous addressing cycles of the portion.

22. The method of claim 19 including the step of writing the data into the first memory as illustrated in FIG. 14.

23. The method if claim 19 including the step of writing the data into the second memory as illustrated in FIG. 13.

* * * * *